United States Patent
Okada

(10) Patent No.: US 7,821,600 B2
(45) Date of Patent: Oct. 26, 2010

(54) PROJECTION DISPLAY APPARATUS

(75) Inventor: Takayuki Okada, Tokyo (JP)

(73) Assignee: NEC Viewtechnology, Ltd., Minato-ku, Tokyo (JP)

( * ) Notice: Subject to any disclaimer, the term of this patent is extended or adjusted under 35 U.S.C. 154(b) by 174 days.

(21) Appl. No.: 11/600,137

(22) Filed: Nov. 16, 2006

(65) Prior Publication Data

US 2007/0132924 A1  Jun. 14, 2007

(30) Foreign Application Priority Data

Dec. 8, 2005 (JP) .............................. 2005-355036

(51) Int. Cl.
*G02F 1/1335* (2006.01)

(52) U.S. Cl. .......................................... 349/117; 349/8

(58) Field of Classification Search .................. 349/117
See application file for complete search history.

(56) References Cited

U.S. PATENT DOCUMENTS

| 5,838,415 | A | * | 11/1998 | Hayashi et al. | ............. | 349/161 |
| 6,844,993 | B2 | | 1/2005 | Fujimori et al. | | |
| 2002/0126228 | A1 | * | 9/2002 | Yajima et al. | ................... | 349/8 |
| 2005/0012870 | A1 | * | 1/2005 | Hirata et al. | ................... | 349/8 |

FOREIGN PATENT DOCUMENTS

| CN | 1469190 A | 1/2004 |
| JP | 10-133096 | 5/1998 |
| JP | 2001-174776 | 6/2001 |
| JP | 2002-072162 | 3/2002 |
| JP | 2002-072162 A | 3/2002 |
| JP | 2002-090873 | 3/2002 |
| JP | 2002-90873 A | 3/2002 |
| JP | 2002-131750 | 5/2002 |
| JP | 2002-244214 | 8/2002 |
| JP | 2002-268139 | 9/2002 |
| JP | 2003-107220 | 4/2003 |
| JP | 2004-78164 A | 3/2004 |
| JP | 2005-157207 | 6/2005 |

OTHER PUBLICATIONS

Chinese Office Action dated Mar. 6, 2009 with English-Language Translation.
Japanese Office Action dated Sep. 9, 2009 (with partial English translation.).
Japanese Office Action dated Feb. 18, 2010 (with English translation).

* cited by examiner

*Primary Examiner*—Uyen Chau N Le
*Assistant Examiner*—Kajli Prince
(74) *Attorney, Agent, or Firm*—McGinn IP Law Group, PLLC

(57) ABSTRACT

A projection display apparatus for combining image lights formed by two or more of different liquid crystal panels through a prism, and projecting the combined image light onto a projection plane through a projection optical system. The apparatus comprises a first optically transmissive substrate opposite an exit plane of the liquid crystal panel, a second optically transmissive substrate opposite an entrance plane of the prism, and at least one third optically transmissive substrate disposed between the first optically transmissive substrate and the second optically transmissive substrate, wherein the first optically transmissive substrate, second optically transmissive substrate, and third optically transmissive substrate are each provided with a polarizer for absorbing a predetermined polarized light component in a predetermined proportion, and the second optically transmissive substrate is adhered to the entrance plane of the prism.

20 Claims, 4 Drawing Sheets

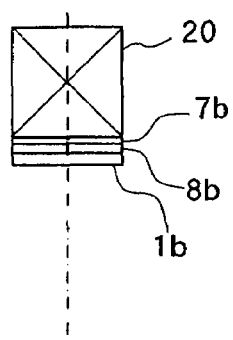
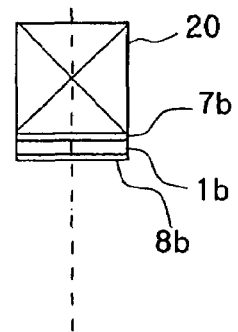
Fig. 5A    Fig. 5B
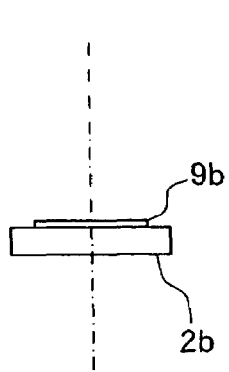
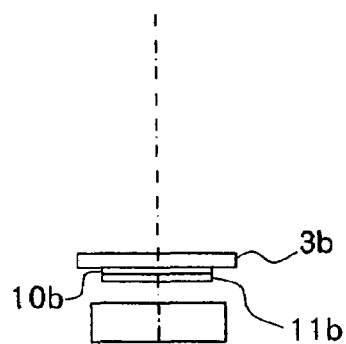
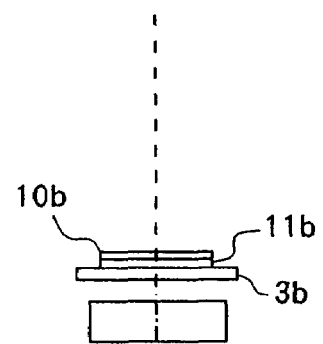
Fig. 6A    Fig. 6B    Fig. 6C

PROJECTION DISPLAY APPARATUS

BACKGROUND OF THE INVENTION

1. Field of the Invention

The present invention relates to a projection display apparatus which projects an image formed by liquid crystal panels onto a screen to provide an enlarged version of the image.

2. Description of the Related Art

In recent years, projection display apparatuses have become increasingly popular for projecting an image formed by liquid crystal panels onto a screen through a projection optical system to provide an enlarged version of the image. FIG. 1 illustrates the structure of a general projection display apparatus around liquid crystal panels.

Liquid crystal panels 100R, 100G, 100B shown in FIG. 1 are transmissive liquid crystal panels. Red light is incident on liquid crystal panel 100R. Green light is incident on liquid crystal panel 100G. Blue light is incident on liquid crystal panel 100B. Red light (R), green light (G), and blue light (B) are emitted from a light source, not shown, and separated by color separating means, not shown either.

Each liquid crystal panel 100R, 100G, 100B modulates light incident thereon based on an image signal to form image light. The formed image light is incident on a cross dichroic prism (XDP 101). The image lights incident on XDP 101 are combined by XDP 101 into full-color image light which is then projected onto a screen, not shown, through projection optical system 102.

Glass substrate 103 each comprising polarizer 102 is disposed between XDP 101 and liquid crystal panel 100R, XDP 101 and liquid crystal panel 100G, XDP 101 and liquid crystal panel 100B. Further, glass substrates 103 disposed between liquid crystal panels 100R and 100B and XDP 101 are each provided with λ/2 wavelength plate 104 in addition to polarizers 102. Here, polarizer 103 absorbs a predetermined polarized light component included in the incident light in a predetermined proportion. Thus, a light beam in a predetermined polarization state (linearly polarized light) alone can be transmitted by polarizer 103. λ/2 plate 104, in turn, gives a phase difference to the linearly polarized light incident thereon to rotate the plane of polarization of the linearly polarized light by 90 degrees. For example, S-polarized light is converted to P-polarized light.

The foregoing is the outline of the structure around liquid crystal panels of a general projection display apparatus. However, the advancement of technologies involved in light sources and liquid crystal panels has led to an increased amount of light which passes through the liquid crystal panels, and to a reduction in size of the liquid crystal panels. This results in simultaneous increases in the amount of light density and heat density of the light which passes through the liquid crystal panels and is incident on the polarizers and λ/2 wavelength plates. The life cycle time of the polarizers and λ/2 wavelength plates is reduced due to the synergistic effect of the increase in light amount density with the increase in heat density.

Accordingly, techniques have been proposed for reducing a thermal burden on polarizers and λ/2 wavelength plates by increasing the number of glass substrates (JP-A-2002-72162). Specifically, a technique has been proposed for performing light absorption and polarization conversion in two separate stages using two sapphire substrates, each of which comprises a polarizer and a λ/2 wavelength plate, between a liquid crystal panel and XDP. According to this technique, since the thermal burden is distributed, thermal burden for each polarizer or λ/2 wavelength plate will be increased.

However, the technologies involved in light sources and liquid crystal panels are improving from day to day. As such, the thermal burden on the polarizers and λ/2 wavelength plates disposed between the liquid crystal panels and XDP tends to increase in the future as well. In order to accommodate a future increase in thermal burden by the technique disclosed in JP-A-2002-72162, it is necessary to further increase the number of glass substrates. Specifically, a larger number of glass substrates should be disposed between each liquid crystal and an XDP to perform light absorption and polarization conversion at three or four separate stages.

However, the following problems can be caused by an increase in the number of glass substrates disposed between a liquid crystal panel and an XDP. First, as a larger number of glass substrates are disposed between a liquid crystal panel and an XDP, the distance becomes longer between the liquid crystal panel and XDP. Then, as the distance becomes longer between the liquid crystal panel and XDP, the back focus must accordingly be made longer in a projection optical system. Specifically, it is necessary to increase the number of lenses which make up the projection optical system, resulting in an increase in size and cost of the apparatus. JP-A-2002-72162 also proposes a reduction in thermal burden, which is achieved by replacing the glass substrate with a sapphire substrate which has a higher thermal conductivity. However, an increase in the number of expensive sapphire substrates causes a direct increase in cost.

Next, an increase in the number of glass substrates causes difficulties in holding these glass substrates. Conventionally, glass substrates are held by a frame, an arm or the like, fixed to a liquid crystal panel, and form part of an assembly together with the liquid crystal panel. Therefore, an increase in the number of glass substrates causes difficulties in securely and accurately holding all glass substrates by the frame or arm. Further, when the assembly is mounted, the assembly is held by an assembling machine for alignment to the XDP. Accordingly, an increase in the number of glass substrates, and a resulting increase in size and weight of the assembly will cause a degradation in alignment accuracy of the assembly to the XDP.

SUMMARY OF THE INVENTION

It is an object of the present invention to solve at least one of the problems of the prior art.

One projection display apparatus of the present invention combines image lights formed by two or more different liquid crystal panels through a prism, and projects the combined image light onto a projection plane through a projection optical system. This projection display apparatus comprises a first optically transmissive substrate opposite an exit plane of the liquid crystal panel, a second optically transmissive substrate opposite an entrance plane of the prism, and at least one third optically transmissive substrate disposed between the first optically transmissive substrate and the second optically transmissive substrate. The first optically transmissive substrate, second optically transmissive substrate, and third optically transmissive substrate are each provided with a polarizer for absorbing a predetermined polarized light component in a predetermined proportion. In addition, the second optically transmissive substrate is adhered to the entrance plane of the prism.

The prism may be provided with a holding mechanism for holding the second optically transmissive substrate.

One or both of the first optically transmissive substrate and third optically transmissive substrate may be held for rotation about the optical axis, and a rotating mechanism may be provided for rotating these optically transmissive substrates. When the first optically transmissive substrate, second optically transmissive substrate, and third optically transmissive substrate are rotated by the rotating mechanism, it is possible to readily align transmission axes of the polarizers disposed on these optically transmissive substrates. For example, if the transmission axes of a plurality of polarizers are not in alignment to one another, a loss of light occurs on each polarizer in accordance with the amount of shift therebetween. This loss of light causes a rise in temperature of the polarizer and a lower luminance of a projected image. When one or both of the first optically transmissive substrate and third optically transmissive substrate can be rotated about the optical axis of light which is transmitted by these substrates, the transmission axes of the respective polarizers can be aligned to each other with reference to the transmission axis of the polarizer disposed on the second optically transmissive substrate.

In the projection display apparatus of the present invention, the second optically transmissive substrate opposite the entrance plane of the prism is positioned in close proximity to the prism. It is therefore possible to dispose three or more optically transmissive substrates between the liquid crystal panel and prism while reducing the distance between the liquid crystal panel and prism as much as possible. Also, the second optically transmissive substrate is adhered to or in pressure contact with the prism, or is held by a holding mechanism provided on the prism. Therefore, the second optically transmissive substrate need not be held by a frame, an arm or the like fixed to the liquid crystal panel.

The above and other objects, features and advantage of the present invention will become apparent from the following description with reference to the accompanying drawings which illustrate examples of the present invention.

BRIEF DESCRIPTION OF THE DRAWINGS

FIGS. 5A, 5B are schematic diagrams each illustrating an exemplary modification to the embodiment of the projection display apparatus according to the present invention; and FIGS. 6A-6C are schematic diagrams each illustrating an exemplary modification to the embodiment of the projection display apparatus according to the present invention.

DESCRIPTION OF THE PREFERRED EMBODIMENTS

This application is based upon and claims the benefit of priority from Japanese Patent Application No. 2005-355036 filed on Dec. 8, 2005, the content of which is incorporated be reference.

Figure 1:
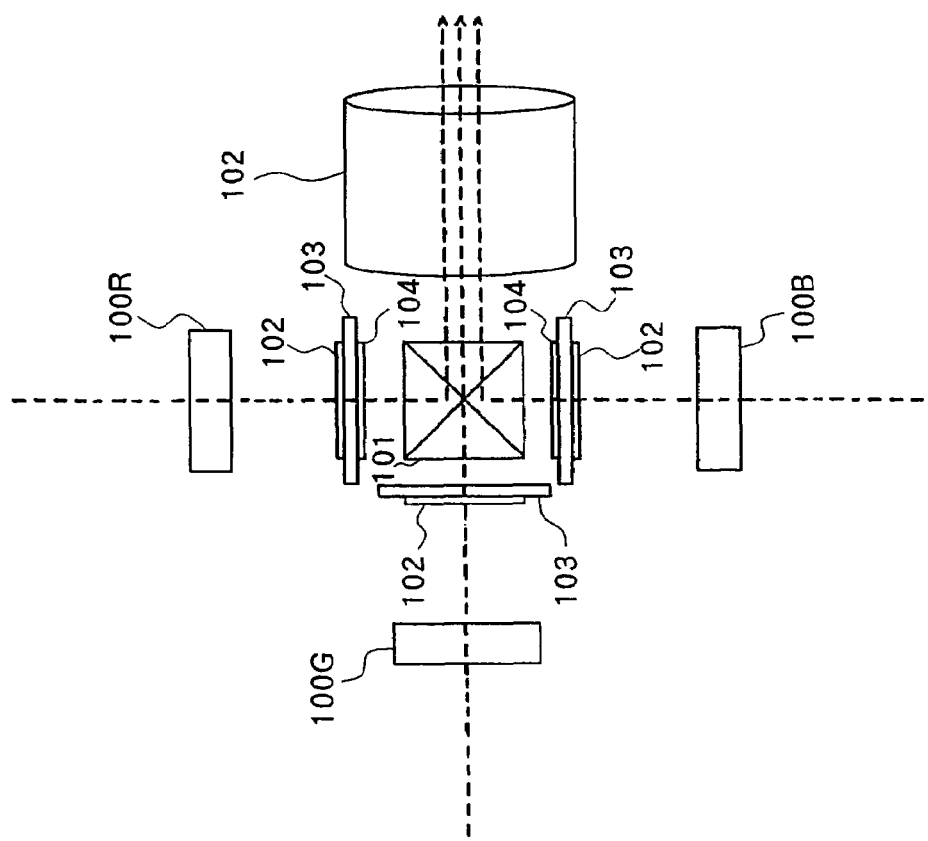
FIG. 1 is a schematic diagram illustrating the structure of a general projection display apparatus around liquid crystal panels.
Figure 2:
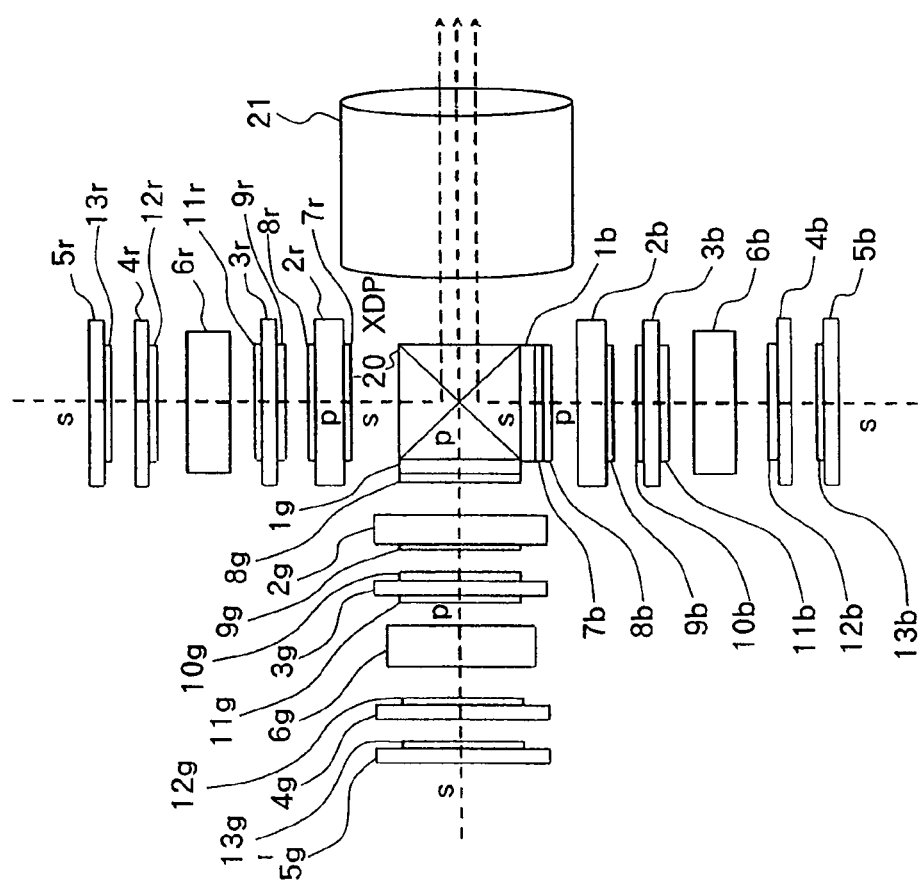
FIG. 2 is a schematic diagram illustrating an exemplary embodiment of a projection display apparatus according to the present invention.

In one embodiment, a projection display apparatus of the present invention is a liquid crystal projector which employs transmissive liquid crystal panels for light valves. FIG. 2 is a schematic diagram illustrating the structure of the liquid crystal projector of this embodiment around liquid crystal panels.

Light emitted from a light source, not shown, is separated into red light, green light, and blue light by color filters and other color separating means, also not shown. The separated red light is incident on illustrated sapphire substrate 5r. The green light is incident on sapphire substrate 5g. The blue light is incident on sapphire substrate 5b. Each color light is unified to be linearly polarized light of S-polarization. The following description will be given in detail of members disposed on a light path of each color light. Nevertheless, members disposed on the respective light paths are basically common, so that a description of duplicate members will be omitted where appropriate.

First, a description will be given of members disposed on the light path of blue light. Disposed on the light path of blue light are sapphire substrate 5b, glass substrate 4b, liquid crystal panel 6b, crystal substrate 3b, crystal substrate 2b, and crystal substrate 1b along a direction in which the light travels. Stated another way, two optically transmissive substrates are disposed in front of liquid crystal panel 6b, while three optically transmissive substrates are disposed between liquid crystal panel 6b and cross dichroic prism (XDP) 20.

Polarizer 13b is adhered to an exit plane of sapphire substrate 5b. Blue light which is incident on sapphire substrate 5b is transmitted by sapphire substrate 5b and is then incident on polarizer 13b. Polarizer 13b transmits only an S-polarized light component of the linearly polarized blue light incident thereon, and absorbs a P-polarized light component of the same.

Glass substrate 4b is disposed at a position at which its entrance plane is diametrically opposite the exit plane (polarizer 13b) of sapphire substrate 5b. A predetermined gap is defined between the exit plane (polarizer 13b) of sapphire substrate 5b and the entrance plane of glass substrate 4b. Further, optical compensation plate 12b is adhered to an exit plane of glass substrate 4b. The blue light which has been transmitted by polarizer 13b that is adhered to sapphire substrate 5b is transmitted by glass substrate 4b, and is then incident on optical compensation plate 12b. Optical compensation plate 12b serves to correct for the influence of birefringence in liquid crystal panel 6b to limit a reduction in contrast. Specifically, the angular orientation of nematic liquid crystal used in liquid crystal panel 6b is changing continuously (liquid crystal molecules have a pre-tilt angle). The birefringence is caused by this pre-tilt angle, and disturbs the polarization axis of light which has been converted to linearly polarized light by a polarizer on the entrance side. As a result, the polarized light is not completely blocked by the polarizer on the exit side, causing light to leak and a reduction in contrast. Thus, because optical compensation plate 12b, whose nature (negative uniaxiality) is the reverse of positive uniaxiality of the nematic liquid crystal, is provided, the influence of the birefringence, which is inherent to the nematic liquid crystal, dose not show up in a projected image.

Liquid crystal panel 6b is a transmissive liquid crystal panel which employs nematic liquid crystal, as mentioned above. Liquid crystal panel 6b is disposed at a position at which its entrance plane is diametrically opposite glass substrate 4b (optical compensation plate 12b). A predetermined gap is defined between the exit plane (optical compensation plate 12b) of glass substrate 4b and the entrance plane of liquid crystal panel 6b. Liquid crystal panel 6b is modulated based on a image signal. The plane of polarization of S-polarized light incident on liquid crystal panel 6b is rotated in accordance with the modulation of liquid crystal panel 6b.

Optical compensation plate 11b is adhered to the entrance plane of liquid crystal substrate 3b, while polarizer 10b is adhered to the exit plane of the same. Liquid crystal substrate 3b is disposed at a position at which optical compensation plate 11b adhered to the entrance plane thereof diametrically opposite an exit plane of liquid crystal panel 6b. A predetermined gap is defined between the exit plane of liquid crystal panel 6b and the entrance plane (optical compensation plate 11b) of liquid crystal plate 3b. The structure and action of optical compensation plate 11b are similar to those of the aforementioned optical compensation plate 12b. Also, polarizer 10b is arranged in cross Nicol position with respect to polarizer 13b. Therefore, polarizer 10b transmits only a P-polarized light component of the linearly polarized blue light which has been transmitted by optical compensation plate 11b and liquid crystal plate 3b, and absorbs an S-polarized light component of the same.

Polarizer 9b is adhered to an entrance plane of crystal substrate 2b. Crystal substrate 2b is disposed at a position at which polarizer 9b adhered to the entrance plane thereof, is diametrically opposite the exit plane (polarizer 10b) of crystal substrate 3b. A predetermined gap is defined between the exit plane (polarizer 10b) of crystal substrate 3b and the entrance plane (polarizer 9b) of crystal substrate 2b. Polarizer 9b is arranged in cross Nicol position with respect to polarizer 13b. Therefore, polarizer 9b transmits only a P-polarized light component of the linearly polarized blue light incident on polarizer 9b, and absorbs an S-polarized light component of the same. In other words, the second absorption is made subsequent to the absorption of the S-polarized light component by preceding polarizer 10b.

$\lambda/2$ wavelength plate 7b is adhered to an entrance plane of crystal substrate 1b. Polarizer 8b is laminated on $\lambda/2$ wavelength plate 7b. Crystal substrate 1b is disposed at a position at which polarizer 8b is diametrically opposite the exit plane of liquid crystal substrate 2b. A predetermined gap is defined between the exit plane of liquid crystal substrate 2b and the entrance plane (polarizer 8b) of crystal substrate 1b. On the other hand, the exit plane of crystal substrate 1b adheres to the entrance plane of XDP 20 by the using of an adhesive. Polarizer 8b is also arranged in cross Nicol position with respect to polarizer 13b. Therefore, polarizer 8b transmits only a P-polarized light component of the linearly polarized blue light incident on polarizer 8b, and absorbs an S-polarized light component of the same. In other words, the third absorption is made subsequent to the absorption of the S-polarized light by preceding polarizers 10b and 9b. Further, the blue light transmitted by polarizer 8b is converted to S-polarized light by $\lambda/2$ wavelength plate 7b.

As described above, three crystal substrates 3b, 2b, 1b, each comprising a polarizer, are disposed between liquid crystal panel 6b and XDP 20 on the light path of blue light. The S-polarized light component is absorbed in three separate stages by three polarizers 10b, 9b, 8b. The absorbed S-polarized light component transforms into heat. Accordingly, deterioration and temperature rise in each of the polarizers 10b, 9b, 8b is reduced in deterioration and temperature rise, as compared with a single polarizer which absorbs the same amount of S-polarized light component (through a single absorption). Further, respective polarizers 10b, 9b, 8b in this embodiment have different absorptances. In addition, crystal substrates 3b, 2b, 1b on which polarizers 10b, 9b, 8b are adhered respectively are designed to have different size (volume) in accordance with the absorptances of polarizers 10b, 9b, 8b. Specifically, among three polarizers 10b, 9b, 8b, polarizer 9b exhibits the highest absorptance, so that crystal substrate 2b, on which polarizer 9b is adhered, is designed to have the largest volume of crystal substrates 3b, 2b, 1b. The reason for this strategy is as follows. In order to provide the least possible number of crystal substrates, crystal substrate 3b is provided with optical compensation plate 11b in addition to polarizer 10b. In other words, crystal substrate 3b is shared by polarizer 10b and optical compensation plate 11b. Since the optical compensation plate absorbs (generates) a smaller amount of heat than the polarizer, polarizer 10b and optical compensation plate 11b are disposed on the same crystal substrate 3b. However, even the optical compensation plate is not free from heat absorption. It is therefore necessary to determine the amount of heat absorbed by polarizer 10b (absorptance) in consideration of the amount of heat absorbed by optical compensation plate 11b. Likewise, with the intention of reducing the number of crystal substrates, crystal substrate 1b is shared by polarizer 8b and $\lambda/2$ wavelength plate 7b. As such, in determining the absorptance of polarizer 8b, similar limitations are imposed on polarizer 8b, as is the case with polarizer 10b. On the other hand, crystal substrate 2b is provided only with polarizer 9b. Therefore, polarizer 9b is designed to exhibit the highest absorptance. In addition, polarizer 9b, which has the highest absorptance, also generates a large amount of heat, so that crystal substrate 2 is designed to have the largest volume, thereby ensuring a sufficient amount of heat dissipation.

More specifically, the amount of heat absorbed by a polarizer depends on a crossed absorptance of the polarizer (the absorptance of light which is polarized in a direction orthogonal to the transmission axis of the polarizer). In this embodiment, polarizers 10b, 9b, 8b exhibit crossed absorptances of 30%, 58%, 100%, respectively. 30% of the S-polarized light incident on polarizer 10b is absorbed by polarizer 10b and transformed into heat, and the remaining 70% is incident on polarizer 9b. 58% of the S-polarized light incident on polarizer 9b is absorbed by polarizer 9b and transformed into heat. Polarizer 8b absorbs all S-polarized light incident thereon.

Further, third crystal substrate 1b is in close contact with XDP 20. This results in a shorter distance between liquid crystal panel 6b and XDP 20, and a shorter back focus of projection optical system 21. Stated another way, an increased number of crystal substrates are disposed between liquid crystal panel 6b and XDP 20 while limiting an extended back focus of projection optical system 21.

Next, a description will be given of members disposed on the light path of green light. Disposed on the light path of green light are sapphire substrate 5g, glass substrate 4g, liquid crystal panel 6g, crystal substrate 3g, crystal substrate 2g, and crystal substrate 1g along a direction in which the light travels. Stated another way, two optically transmissive substrates are disposed in front of liquid crystal panel 6g, while three optically transmissive substrates are disposed between liquid crystal panel 6g and XDP 20.

Sapphire substrate 5g and glass substrate 4g are the same as sapphire substrate 5b and glass substrate 4b disposed on the light path of blue light. In addition, polarizer 13g, which is the same as polarizer 13b, is adhered to an exit plane of sapphire substrate 5g. Optical compensation plate 12g, which is the same as optical compensation plate 12b, is adhered to an exit plane of glass substrate 4g.

Likewise, liquid crystal panel 6g, crystal substrate 3g, and crystal substrate 2g are the same as those disposed on the light path of blue light. Further, optical compensation plate 11g, which is the same as optical compensation plate 11b, is adhered to an entrance plane of crystal substrate 3g. Polarizer 10g, which is the same as polarizer 10b, is adhered to an exit plane of crystal substrate 3g. Also, polarizer 9g, which is the same as polarizer 9b, is adhered to an entrance plane of crystal substrate 2g.

The exit plane of crystal substrate 1g adheres to the entrance plane of XDP 20 with an adhesive. Polarizer 8g, which is the same as polarizer 8b, is adhered to an entrance plane of crystal substrate 1g. An effect that is produced by crystal substrate 1g arranged in close contact with XDP 20 is the same as the effect produced by crystal substrate 1b arranged in close contact with XDP 20.

In essence, the members disposed on the light path of blue light differ from the members disposed on the light path of green light only in that crystal substrate 1g adhered to XDP 20 does not comprise a λ/2 wavelength plate. Therefore, green light emitted from liquid crystal panel 6g is incident on XDP 20 without undergoing polarization conversion. However, whether or not the light incident on XDP 20 should be converted in polarization depends on the reflection/transmission characteristics of XDP 20 and is not an essential factor of the present invention.

Likewise, on the light path of green light, an S-polarized light component is absorbed by three polarizers 10g, 9g, 8g in three separate stages. Further, polarizer 9g has the highest absorptance of three polarizers 10g, 9g, 8g. Accordingly, crystal substrate 2g, to which polarizer 9g is adhered, has the largest volume of three crystal substrates 3g, 2g, 1g.

According to experiments made by the inventors, it has been confirmed that the temperatures of polarizers 10g, 9g, 8g disposed on the light path of green light are lower than the temperatures of the polarizers respectively disposed on the two sapphire substrates, by approximately 15° C. This reduction in thermal load contributed to a significant improvement in the life cycle of each polarizer which is increased by approximately 3.5 times. Likewise, an improvement was also observed in the lifetime of the output side polarizer disposed on the light path of blue light.

Next, a description will be given of members disposed on the light path of red light. Disposed on the light path of red light are sapphire substrate 5r, glass substrate 4r, liquid crystal panel 6r, crystal substrate 3r, and crystal substrate 2r along a direction in which the light travels. Stated another way, two optically transmissive substrates are disposed in front of liquid crystal panel 6r, and another two optically transmissive substrates are disposed between liquid crystal panel 6r and XDP 20 as well.

Sapphire substrate 5r and glass substrate 4r are the same as sapphire substrate 5b and glass substrate 4b disposed on the light path of blue light. In addition, polarizer 13r, which is the same as polarizer 13b, is adhered to an exit plane of sapphire substrate 5r. Optical compensation plate 12r, which is the same as optical compensation plate 12b, is adhered to an exit plane of glass substrate 4r.

Liquid crystal panel 6r and crystal substrate 3r are the same as liquid crystal panel 6b and crystal substrate 3b disposed on the light path of blue light. Optical compensation plate 11r which is the same as optical compensation plate 11b, is adhered to an entrance plane of crystal substrate 3r. Polarizer 9r, which is the same as polarizer 9b, is adhered to an exit plane of crystal substrate 3r.

Polarizer 8r, which is the same as polarizer 8b, is adhered to an entrance plane of crystal substrate 2r. λ/2 wavelength plate 7r, which is the same as λ/2 wavelength plate 7b, is adhered to an exit plane of crystal substrate 2r. Then, a predetermined gap is defined between crystal substrate 2r and XDP 20. In essence, the first difference between the members disposed on the aforementioned light paths and the members disposed on the light path of red light is whether or not the crystal substrate closest to XDP 20 is in close contact with XDP 20. Specifically, crystal substrate 1b disposed on the light path of blue light and crystal substrate 1g disposed on the light path of green light are adhered to and in close contact with XDP 20. On the other hand, a predetermined gap is defined between crystal substrate 2r disposed on the light path of red light and XDP 20. In addition, a second difference between the members disposed on the aforementioned light paths and the members disposed on the light path of red light lies in the number of crystal substrates disposed between liquid crystal panel and XDP. Specifically, three crystal substrates are disposed between liquid crystal panel on the light path of each of the blue light and green light and XDP. On the other hand, two crystal substrates are disposed between liquid crystal panel on the light path of red light and XDP.

Essentially, since the members disposed on the light path of red light smaller less thermal burdens than the members disposed on the light paths of the other color lights, the number of polarizers is simply reduced by one to absorb the light in two separate stages. Therefore, the present invention does not exclude a configuration which has three or more crystal substrates disposed on the light path of red light. Also, it is a foregone conclusion, due to the fact that the number of polarizers is fewer by one, that the number of crystal substrates is fewer by one than in the other light paths, so that the present invention does not exclude additional provision of crystal substrates, associated with additional provision of polarizers. Further, in this embodiment, there are two crystal substrates which are disposed on the light path of red light, so that crystal substrate 2r need not be brought into close contact with XDP 20 for reducing the distance between liquid crystal panel 6r and XDP 20. However, the present invention does not exclude crystal substrate 2r which is in close contact with XDP 20. In addition, the present invention does not exclude a configuration in which an additionally provided crystal substrate is in close contact with XDP 20.

Crystal substrate 3b and crystal substrate 2b disposed on the light path of blue light are held by a frame, not shown, which is fixed to liquid crystal panel 6b disposed on this light path, and are integrated with liquid crystal panel 6b. Also, crystal substrate 3g and crystal substrate 2g disposed on the light path of green light are held by a frame, not shown, which is fixed to liquid crystal panel 6g disposed on the same light path, and are integrated with liquid crystal panel 6g. Further, crystal substrate 3r and crystal substrate 2r disposed on the light path of red light are held by a frame, not shown, fixed to liquid crystal panel 6r disposed on the same light path, and are integrated with liquid crystal panel 6r. In addition, cooling air is supplied to the gaps between the respective members disposed on the respective light paths by a fan, not shown.

Alternatively, instead of having the exit planes of crystal substrate 1b and crystal substrate 1g adhere to the entrance planes of XDP 20, these crystal substrate 1b and crystal substrate 1g may be urged toward XDP 20 by urging means, such that the exit planes of crystal substrate 1b and crystal substrate 1g may be brought into close contact with the entrance planes of XDP 20.

Further alternatively, crystal substrate 1b and crystal substrate 1g may be held by holding means provided for XDP 20 such that their exit planes are in close contact with the entrance planes of XDP 20. The holding means is not particularly limited to any specific configuration. For example, an arm or a bracket projected from an entrance plane or another plane of XDP 20 may be given as examples of holding means. Further, the arm or bracket may be formed of a resilient material, such that the exit planes of crystal substrate 1b and crystal substrate 1g are brought into close contact with the entrance planes of XDP 20, making use of a resilient restoring force of the arm or bracket. In this connection, such urging means and holding means can be used when an optically transmissive substrate is disposed in close contact with XDP 20, other than crystal substrate 1b and crystal substrate 1g.

In any case, when the optically transmissive substrate is partially fixed to the XDP, the following advantages are provided. Conventionally, the optically transmissive substrate disposed between the liquid crystal panel and XDP is held by a frame, an arm or the like fixed to the liquid crystal panel, and forms part of an assembly together with the liquid crystal panel. Therefore, an increase in the number of optically transmissive substrates cause difficulties in securely and accurately holding all glass substrates by the frame or arm. Further, when the assembly is mounted, the assembly is held by an assembling machine for alignment to the XDP. Accordingly, an increase in the number of glass substrates, and a resulting increase in size and weight of the assembly cause a degradation in alignment accuracy of the assembly to the XDP. In contrast, when the optically transmissive substrate is partially fixed to the XDP as in this embodiment, even an increase in the number of optically transmissive substrates would not cause the above-mentioned disadvantage. Then, when the number of optically transmissive substrates can be increased, the number of polarizers can be increased to further distribute a thermal burden.

All or part of crystal substrates 3b, 2b, 3g, 2g, 3r, 2r may be rotatable about their optical axes.

Next, a description will be given of exemplary modifications to the liquid crystal projector of the foregoing embodiment. The configurations of the members disposed on the light paths of the respective color lights illustrated in FIG. 2 can be mutually applied to the light paths of the other color lights. For example, the members disposed on the light path of blue light can be disposed on the light path of green light or red light.

Figure 3:
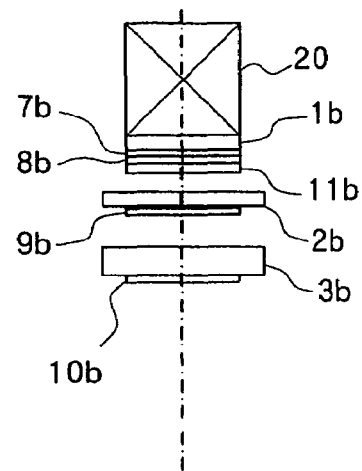
FIG. 3 is a schematic diagram illustrating an exemplary modification to the embodiment of the projection display apparatus according to the present invention.
Figures 4A, 4B, 4C:
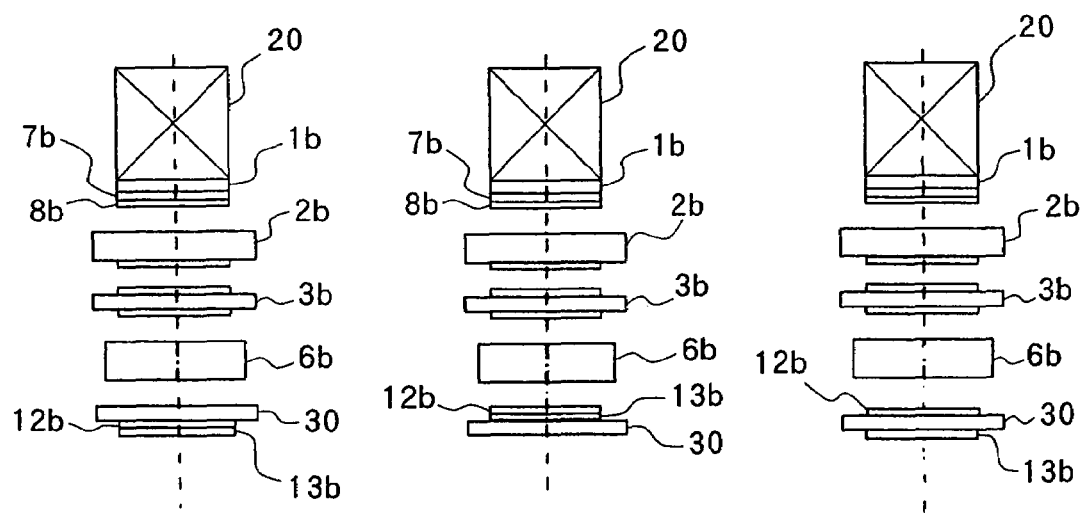
FIGS. 4A-4C are schematic diagrams each illustrating an exemplary modification to the embodiment of the projection display apparatus according to the present invention.

For example, optical compensation plate 11b can be laminated on polarizer 8b, as illustrated in FIG. 3. Also, polarizer 13b and optical compensation plate 12b illustrated in FIG. 2 can be disposed on a common optically transmissive substrate. In this event, polarizer 13b and optical compensation plate 12b may be laminated on entrance planes of optically transmissive substrate 30, as illustrated in FIG. 4A, or may be laminated on exit planes of the same, as illustrated in FIG. 4B. Alternatively, one may be laminated on an entrance plane of optically transmissive substrate 30, while the other on an exit plane of the same, as illustrated in FIG. 4C.

Also, as illustrated in FIG. 5A, polarizer 8b and λ/2 wavelength plate 7b shown in FIG. 2 can be disposed on the exit plane of crystal substrate 1b. Further, as illustrated in FIG. 5B, either polarizer 8b or λ/2 wavelength plate 7b may be disposed on the entrance plane of crystal substrate 1b, and the other on the exit plane of the same.

Also, as illustrated in FIG. 6A, polarizer 9b shown in FIG. 2 can be disposed on the exit plane of crystal substrate 2b. As illustrated in FIG. 6B or 6C, optical compensation plate 11b and polarizer 10b can be laminated on the entrance plane or exit plane of crystal substrate 3b.

Here, exemplary modifications have been described in connection with the members disposed on the light path of blue light. However, similar modifications can be made in regard to the members disposed on other light paths. Also, the glass substrates so far described can be replaced with sapphire substrates, crystal substrates, and other optically transmissive substrates which exhibit higher thermal conductivities. Of course, the sapphire substrates and crystal substrates so far described can be replaced with glass substrates or other cheaper optically transmissive substrates in order to reduce the cost.

The polarizers, optical compensation plates, λ/2 wavelength plates so far described are not limited to tabular ones. The polarizers, optical compensation plates, and λ/2 wavelength plates include all equivalents such as membranes, films, layers and the like which produce the actions described above.

In the exemplary modifications, the optically transmissive substrates may be rotatable about their optical axes, except for those which are opposite the entrance planes of the XDP.

While preferred embodiments of the present invention have been described using specific terms, such description is for illustrative purposes only, and it is to be understood that changes and variations may be made without departing from the spirit or scope of the following claims.

What is claimed is:

1. A projection display apparatus for projecting light which is formed by two or more different liquid crystal panels and combined by a prism, comprising:
    a first optically transmissive substrate opposite an exit plane of said liquid crystal panel;
    a second optically transmissive substrate opposite an entrance plane of said prism; and
    at least one third optically transmissive substrate disposed between said first optically transmissive substrate and said second optically transmissive substrate,
    wherein said first optically transmissive substrate, said second optically transmissive substrate, and said third optically transmissive substrate are each provided with a polarizer for absorbing a predetermined polarized light component in a predetermined proportion, and said second optically transmissive substrate is adhered to the entrance plane of said prism, and
    wherein a gap is defined between said first optically transmissive substrate and said third optically transmissive substrate, and a gap is defined between said second optically transmissive substrate and said third optically transmissive substrate.

2. The projection display apparatus according to claim 1, further comprising an optical compensation plate disposed on one or both of said first optically transmissive substrate and said third optically transmissive substrate to compensate for a disturbance to a polarization axis caused by an orientation angle of said liquid crystal panel.

3. The projection display apparatus according to claim 1, further comprising a λ/2 wavelength plate disposed on said second optically transmissive substrate for changing a degree of polarization of light which has passed through said polarizer disposed on said second optically transmissive substrate.

4. The projection display apparatus according to claim 1, wherein either or both of said first optically transmissive substrate and said third optically transmissive substrate are rotatable about an optical axis.

5. The projection display apparatus according to claim 1, wherein all or some of said first optically transmissive substrate, said second optically transmissive substrate, and said third optically transmissive substrate comprise crystal substrates or sapphire substrates.

6. The projection display apparatus according to claim 1, further comprising:
    a fourth optically transmissive substrate opposite an entrance plane of said liquid crystal panel; and
    a fifth optically transmissive substrate disposed between said fourth optically transmissive substrate and said liquid crystal panel,
    wherein said fourth optically transmissive substrate and said fifth optically transmissive substrate are each provided with a polarizer for absorbing a predetermined polarized light component in a predetermined proportion.

7. The projection display apparatus according to claim 1, wherein an angular orientation of a nematic liquid crystal used in a liquid crystal panel changes continuously.

8. The projection display apparatus according to claim 1, wherein the polarizer of said first optically transmissive substrate is adhered to an exit plane of the first optically transmissive substrate.

9. The projection display apparatus according to claim 1, wherein an S-polarized light component is absorbed in three separate stages by the polarizers of said first, second, and third optically transmissive substrates.

10. A projection display apparatus for projecting light which is formed by two or more different liquid crystal panels and combined by a prism, comprising:
   a first optically transmissive substrate opposite an exit plane of each liquid crystal panel;
   a second optically transmissive substrate opposite each entrance plane of said prism; and
   at least one third optically transmissive substrate disposed between said first optically transmissive substrate and said second optically transmissive substrate,
   wherein said first optically transmissive substrate, said second optically transmissive substrate, and said third optically transmissive substrate are each provided with a polarizer for absorbing a predetermined polarized light component in a predetermined proportion, and said second optically transmissive substrate is in pressure contact with the entrance plane of said prism, and
      wherein a gap is defined between said first optically transmissive substrate and said third optically transmissive substrate, and a gap is defined between said second optically transmissive substrate and said third optically transmissive substrate.

11. The projection display apparatus according to claim 10, further comprising an optical compensation plate disposed on one or both of said first optically transmissive substrate and said third optically transmissive substrate to compensate for a disturbance to a polarization axis caused by an orientation angle of said liquid crystal panel.

12. The projection display apparatus according to claim 10, further comprising a λ/2 wavelength plate disposed on said second optically transmissive substrate for changing a degree of polarization of light which has passed through said polarizer disposed on said second optically transmissive substrate.

13. The projection display apparatus according to claim 10, wherein either or both of said first optically transmissive substrate and said third optically transmissive substrate are rotatable about an optical axis.

14. The projection display apparatus according to claim 10, wherein all or some of said first optically transmissive substrate, said second optically transmissive substrate, and said third optically transmissive substrate comprise crystal substrates or sapphire substrates.

15. A projection display apparatus for projecting light which is formed by two or more different liquid crystal panels and combined by a prism, comprising:
   a first optically transmissive substrate opposite an exit plane of each liquid crystal panel;
   a second optically transmissive substrate opposite each entrance plane of said prism;
   at least one third optically transmissive substrate disposed between said first optically transmissive substrate and said second optically transmissive substrate; and
   a holding mechanism disposed on said prism for holding said second optically transmissive substrate,
   wherein said first optically transmissive substrate, said second optically transmissive substrate, and said third optically transmissive substrate are each provided with a polarizer for absorbing a predetermined polarized light component in a predetermined proportion, and
   wherein a gap is defined between said first optically transmissive substrate and said third optically transmissive substrate, and a gap is defined between said second optically transmissive substrate and said third optically transmissive substrate.

16. The projection display apparatus according to claim 15, further comprising an optical compensation plate disposed on one or both of said first optically transmissive substrate and said third optically transmissive substrate to compensate for a disturbance to a polarization axis caused by an orientation angle of said liquid crystal panel.

17. The projection display apparatus according to claim 15, further comprising a λ/2 wavelength plate disposed on said second optically transmissive substrate for changing a degree of polarization of light which has passed through said polarizer disposed on said second optically transmissive substrate.

18. The projection display apparatus according to claim 15, wherein either or both of said first optically transmissive substrate and said third optically transmissive substrate are rotatable about an optical axis.

19. The projection display apparatus according to claim 15, wherein all or some of said first optically transmissive substrate, said second optically transmissive substrate, and said third optically transmissive substrate comprise crystal substrates or sapphire substrates.

20. The projection display apparatus according to claim 15, wherein said holding mechanism comprises a bracket.

* * * * *